Figure 1:
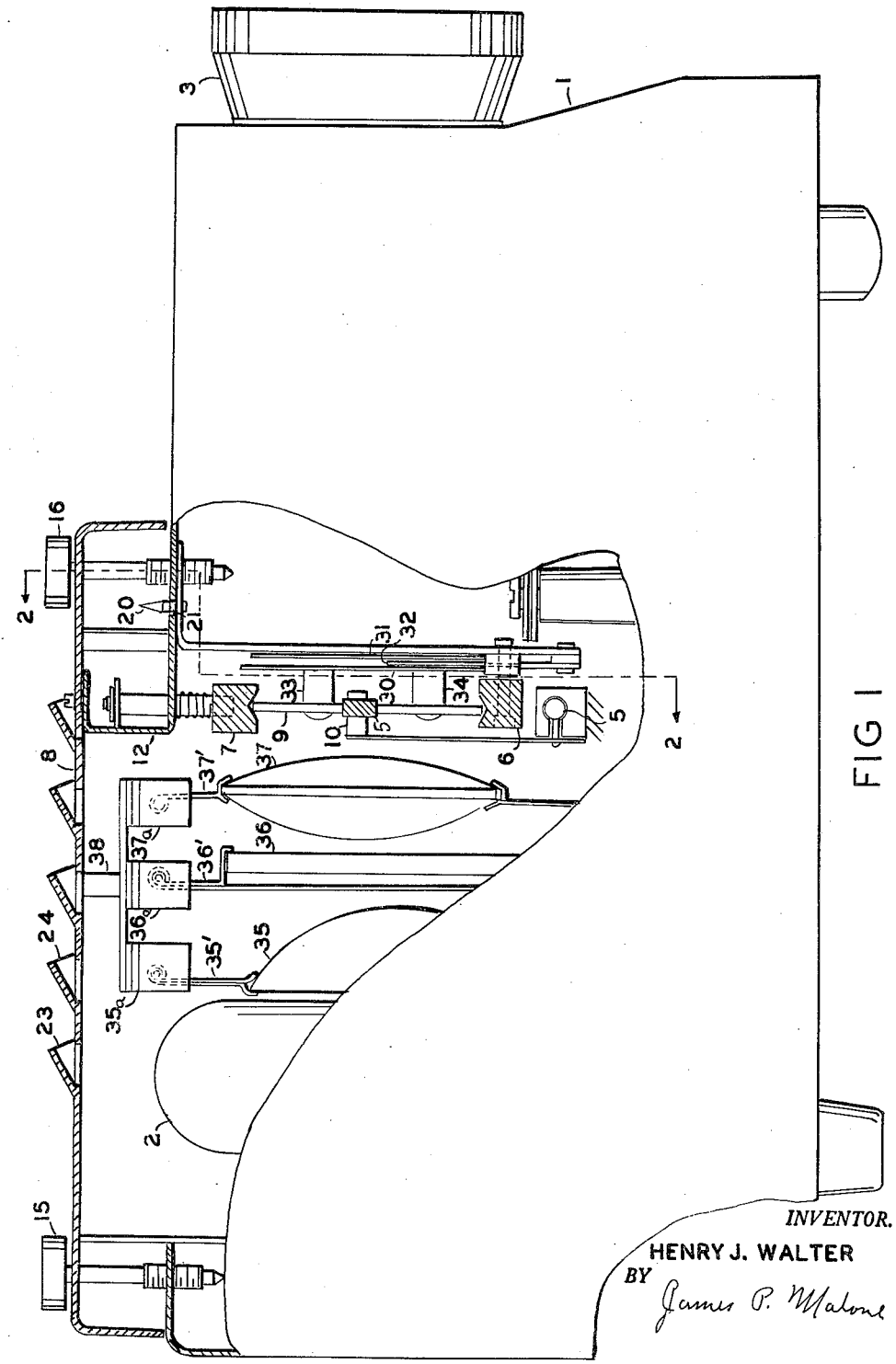

May 22, 1962

H. J. WALTER 3,035,485

SLIDE GUIDE MEANS FOR PROJECTORS

Filed Nov. 14, 1960

2 Sheets-Sheet 1

INVENTOR.
HENRY J. WALTER
BY James P. Malone

United States Patent Office 3,035,485
Patented May 22, 1962

3,035,485
SLIDE GUIDE MEANS FOR PROJECTORS
Henry J. Walter, Bethpage, N.Y., assignor to
Viewlex, Inc., Long Island City, N.Y.
Filed Nov. 14, 1960, Ser. No. 69,114
3 Claims. (Cl. 88—26)

This invention relates to slide guide means for slide projectors and more particularly to such means wherein the slides are easily accessible at all times to correct jamming of slides.

In modern slide projectors, the slides are generally carried in a magazine which is inserted in the projector and the slides are pushed into viewing position with automatic, motor controlled or manual pusher means. One of the problems arising from this type operation is jamming of slides due to the fact that slides sometimes become worn, bent, dogeared, or otherwise damaged and also because the slide mountings may be of different thicknesses. Occasionally, therefore, the slides may slip off the pusher member and become jammed. This not only interrupts the viewing enjoyment but generally damages or ruins several slides and may cause damage to the projector.

In conventional projectors it is not easy to remove these jammed slides due to the fact that the slide carriers or guides are inaccsesible and the projector must generally be practically dismantled to extract jammed slides. It is generally necessary to try to poke out the slides with a long screw driver or other tool, or with the fingers. The latter is not satisfactory since the projector is generally very hot, and the valuable slide might get completely damaged.

The present invention solves this difficulty by providing a top slide guide which is mounted in an easily removable manner preferably in the housing cover so that, should a jamming condition arise, the cover may be easily removed, thereby removing the top guide also and relieving the pressure on the jammed slides. The jammed slides may then be easily extracted with the fingers without any danger of burning the fingers. Special means are provided for locating the cover and/or the top slide guide on the projector housing with sufficient accuracy so that the fixed lower guide and the cover mounted upper slide guide are accurately aligned in the vertical slide movement plane for proper operation of the slides.

Accordingly, a principal object of the invention is to provide new and improved slide guide means for projectors.

Another object of the invention is to provide new and improved slide guide means for projectors which are easily accessible for correcting any jamming.

Another object of the invention is to provide new and improved slide guide means which are easily removable, and separable.

Another object of the invention is to provide new and improved projector means wherein the top slide guide is mounted in an easily removable cover, the cover having locating means to align the cover mounted slide guide in the proper vertical plane for the slide movement.

These and other objects of the invention will be apparent from the following specification and drawings, of which FIG. 1 is an elevation sectional view of the embodiment of the invention, partially cut away.

Figure 2:
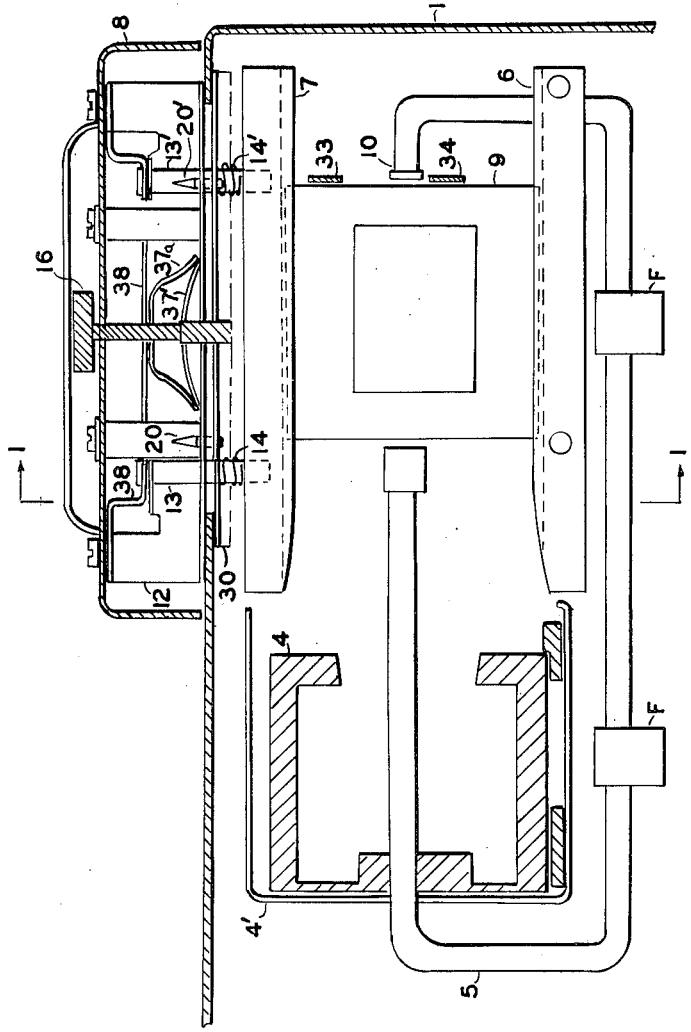

FIG. 2 is a detail sectional view taken along line 2—2 of FIG. 1.

Referring to the figures there is shown a slide projector having a housing 1, a projector lamp 2 and a focusing lens 3. A slide magazine 4 is mounted in guide 4' which is mounted in the housing parallel the optical axis. Slide pusher means 5 are slidably mounted in frame F, are preferably motor operated in conventional manner, and are adapted to push slides from a position in the slide magazine 4 in the guide 4' to the viewing position behind the focusing lens 3.

The apparatus described thus far is conventional. The improvement of the present invention resides in the arrangement for guiding the slides, comprising a lower fixed guide 6 mounted on frame member 30 and an upper guide 7, which is removably mounted in a removable cover 8 with spring loading. The guides 6 and 7 are tapered at the slide entry end to permit easy entry of the slides. The slide 9 fits into the V-shaped slotted portions of the guides as shown in FIG. 1 and is pushed back and forth by the pusher member 5 and return member 10 connected to the pusher member 5.

The cover 8 assembly contains bracket 12 mounted thereon and the upper slide guide 7 which is mounted on the bracket 12 by means of the studs 13 and 13'. The upper guide 7 is spring loaded down by means of springs 14, 14' on each stud to locate the slides and minimize jamming. The cover 8 is secured to the housing 1 by means of the thumb screws 15 and 16, which fit into the threaded portions of the housing 1.

In order to insure proper alignment of the uppeer guide in the same vertical slide movement plane as the lower guide, additional locating pins 20, 20' are provided on the housing. These pins have relatively sharp points which fit into correspondingly shaped recesses in the holes 21, 21' in the cover bracket 12. Alternatively the bracket 12 assembly may be removably mounted on the housing frame with thumb screws separately from the cover.

A conventional shutter arrangement is operated by the slide pusher. The shutter comprises a pair of overlapping leaves 30, 31 which are mounted on the pivotally mounted arm 32 which is normally spring loaded in closed position. The projections 33, 34 are mounted on the shutter 30 and extend into the path of the slide so that when the slide is pushed into viewing position the shutter 30, 31 is pushed back. However, when the slide is returned to the magazine the shutter resumes to normal spring loaded closed position.

The cover 8 extends along the optical axis and over the lamp 2, the condensing lenses and the slide moving means. Vents 23, 24, etc. are provided in the cover for ventilating this area of the projector which becomes very hot due to the heat of the lamp.

The lenses 35, 36, 37 are supported in circular holders 35', 36', 37', which are anchored to the frame at their lower ends in conventional manner. The leaf springs 35A, 36A, 37A are mounted on bracket 38, which is connected to the cover 8 in such manner that when the cover is secured the springs exert a downward pressure on the lens holders.

The operation of the device is conventional except that if a jamming of slides arises for any reason then the cover 8 and upper slide guide 7 are quickly and easily removed by means of the thumb nuts 15 and 16 so that the jammed slides may be quickly and easily removed with the fingers. The cover is then replaced and the remaining slides are shown. The present cover arrangement also makes the lamp and lenses accessible for easy replacement. The removable slide guide of the present invention is not limited to a cover mounting but may be mounted in a separate subassembly. For instance the bracket 12 assembly, including the top guide 7, could be mounted on the frame member 30 with thumb screws and the cover could be mounted separately with thumb screws 15 and 16.

Many other modifications may be made by those who desire to practice the invention without departing from the scope thereof which is defined by the following claims.

I claim:

1. In a slide projector of the type having a housing and slide carrier means permanently mounted in said housing; a cover removably mounted on top of said housing, slide guide means comprising a fixed position lower slide guide channel mounted in said housing, an upper slide guide channel mounted in said cover so as to be removed with said cover, means to spring load said upper slide guide downwardly and indexing and locating means in said housing and cover to align said upper slide guide in the same vertical plane as said lower slide guide with an accuracy sufficient for operable movement of said slides in said guides whereby jammed slides may be easily and quickly removed by removing said cover, said indexing and locating means comprising a pair of locating pins mounted on said housing and extending upwardly, and a pair of corresponding apertures in said cover adapted to receive said pins.

2. In a slide projector of the type having a housing and slide carrier means in said housing; cover removably mounted on top of said housing, slide guide means comprising a lower slide guide channel mounted in said housing, an upper slide guide channel mounted in said cover so as to be removed with said cover, and locating means in said cover and housing to align said upper slide guide in the same vertical plane as said lower slide guide with an accuracy sufficient for operable movement of said slides in said guides whereby jammed slides may be easily and quickly removed by removing said cover, said indexing and locating means comprising a pair of locating pins mounted on said housing and extending upwardly, and a pair of corresponding apertures in said cover adapted to receive said pins.

3. In a slide projector of the type having a housing, automatic slide carrier means in said housing, and a cover removably mounted on top of said housing; slide guide means comprising a fixed position lower side guide channel mounted in said housing, an upper slide guide channel mounted in said cover so as to be removed with said cover, slide pusher means mounted in said housing and adapted to push and return slides in said guides, said guides being tapered at their slide enry end and said upper guide being spring loaded to locate said slides and minimize the possibility of jamming, locating means in said cover and said housing to align said upper slide guide in the same vertical plane as said lower slide guide and said slide pusher means with an accuracy sufficient for operable movement of said slides in said guides whereby jammed slides may be easily and quickly removed by removing said cover, said indexing and locating means comprising a pair of locating pins mounted on said housing and extending upwardly, and a pair of corresponding apertures in said cover adapted to receive said pins.

References Cited in the file of this patent

UNITED STATES PATENTS

| | | |
|---|---|---|
| 2,175,343 | Cunningham et al. | Oct. 10, 1939 |
| 2,496,724 | Host | Feb. 7, 1950 |
| 2,645,170 | Heidecke | Jan. 14, 1953 |
| 2,793,563 | Koskela | May 28, 1957 |